Jan. 27, 1953   P. M. MAZUR ET AL   2,626,591
MEANS FOR HOUSING AND FEEDING LIVESTOCK
Filed June 4, 1948   3 Sheets-Sheet 2

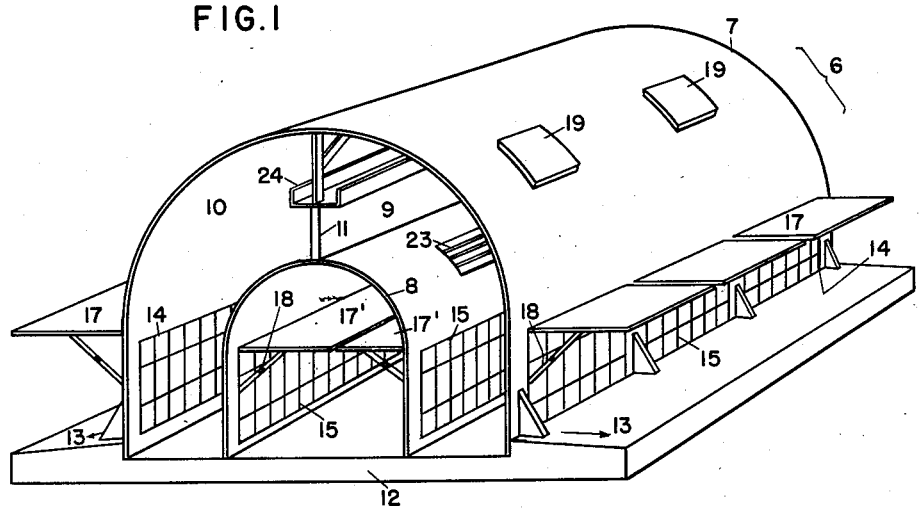
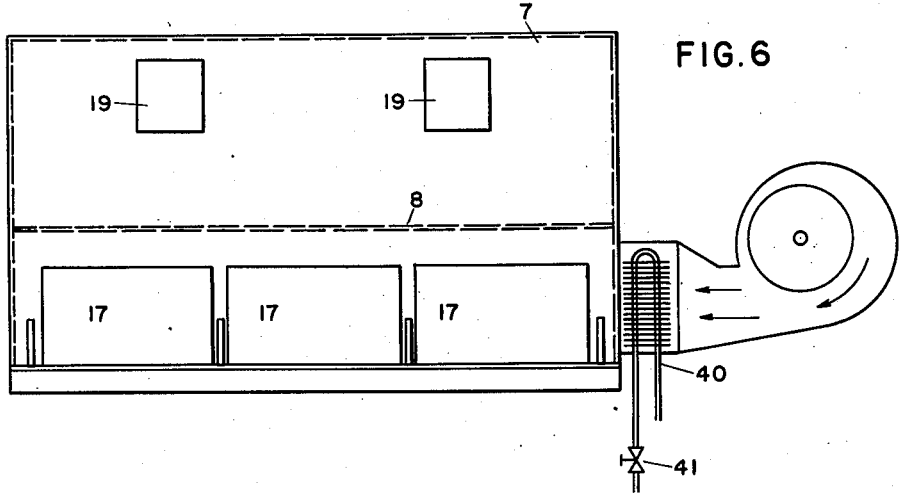

INVENTOR.
Paul M. Mazur and
BY Robert Barnhart

Jan. 27, 1953  P. M. MAZUR ET AL  2,626,591
MEANS FOR HOUSING AND FEEDING LIVESTOCK
Filed June 4, 1948  3 Sheets-Sheet 3

*INVENTOR.*
Paul M. Mazur and
BY  Robert Barnhart

Patented Jan. 27, 1953

2,626,591

UNITED STATES PATENT OFFICE 2,626,591

MEANS FOR HOUSING AND FEEDING LIVESTOCK

Paul M. Mazur and Robert Barnhart, Titusville, N. J.; said Barnhart assignor to said Mazur Application June 4, 1948, Serial No. 31,125

4 Claims. (Cl. 119—16)

This invention relates to methods of and means for housing and feeding livestock.

The general object of the invention is to provide a structure adapted to serve as a barn and containing devices for storing hay or similar feed material which may be dried uniformly throughout the storage area of the barn and self-fed to livestock with little or no labor required.

A feature of one form of the invention consists in the provision of a multiple structure for housing cattle, in which an inner feeder tunnel is positioned within an outer barn shell. Means are provided for loading hay or the like in the space between the inner tunnel and outer shell. Other means, comprising feeding gates are so located in the walls of the tunnel and shell so that livestock may from positions within and without the structure feed themselves from a supply of hay which continuously drops to desired feeding positions substantially automatically.

Another feature of the invention provides for uniform drying of hay positioned between the tunnel and outer shell. A series of inlet and outlet openings are provided for routing air, treated as desired, through certain portions of or all of the area between the tunnel and outer shell, with the result that air will be directed to those portions of the storage area which require effective drying action.

Another feature of the invention resides in the provision of a structure having a storage area with smooth sides so arranged that hay or similar feed material will by gravity drop to desired feeding stations. While little or no labor is ordinarily required for dislodging or pushing feed material into desired position, applicants do provide a simple cat-walk which assures equal distribution on both sides of the storage area and also enables easy reach into both areas, one on each side of a central partition, for pushing the feed material toward the desired feed stations.

Another form of the invention resides in the use of a plurality of substantially identical self-feeding units adapted to be joined together so that cattle may self-feed themselves from a plurality of stations on different sides of the units. By combining such units applicants provide a barn structure with an interior area where animals may be housed in inclement weather, but which enables animals to feed from outside positions during favorable weather.

A feature of the invention arranged for use in applicants' barn structures covers a feeding gate, adapted to be hinged from horizontal supporting beams so that feeding animals may place their muzzles or snouts through openings in the gates and swing them inwardly on overhead hinges. As a result, hay, or the like, behind the gate will be cleared from the space behind the gate until the animals can no longer easily reach upwardly. The gates will then recede whereupon hay from above will slide down into the cleared space whereupon feeding may be resumed.

A further feature consists in providing a series of airtight bulkheads adapted to be positioned adjacent feeding gates. Said bulkheads may be set in closed position when it is desired to provide a closed area about stored hay through which drying air is circulated. When it is desired to feed livestock, one or more of the bulkheads, as required, will be swung in open position whereupon the cattle may then feed through the feeding gates positioned behind the bulkheads.

Another feature resides in positioning a series of bulkheads in the outer wall of a barn structure whereby the bulkheads may be swung outwardly and form a protecting roof or covering surface for cattle then permitted to feed from outside the structure.

Another feature consists in providing a safety feeding gate with safety partitions between adjacent gates so that (1) the heads of feeding cattle may readily push against portions of a gate instead of against the weight of an entire gate unit and (2) a downward swinging gate or receding portion thereof will not injure the animal.

Another feature consists in providing a flexible chain or pushing element between adjacent individually swinging bars of a feeding gate so that the head of an animal may readily apply pressure to push up a portion of the gate without being injured as the gate moves up or recedes downwardly.

Other features covering structural advantages, methods of and means for drying and conditioning hay, storage of hay, housing of animals, and self-feeding of animals from indoor and outdoor positions, all accomplished expeditiously and with a minimum of expense, will be more apparent from the following description of the invention to be read together with the accompanying drawings in which:

Fig. 1 illustrates one form of barn structure for storing and self-feeding hay or similar feed material;

Fig. 6 illustrates one form of air treating means adapted to be employed in combination with a feeding barn for drying hay or the like stored therein.

Figure 2:
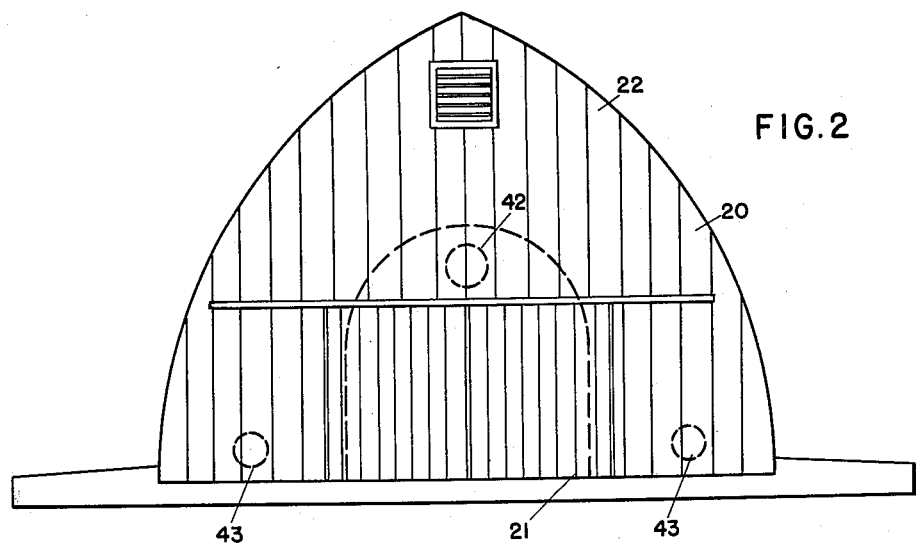
Fig. 2 is a fragmentary, front view of one end of a structure such as that shown in Fig. 1 when enclosed.

Considering the drawings, similar designations referring to similar parts, numeral 6 generally refers to a barn structure having an outer shell 7 and an inner feeder tunnel 8 forming storage areas 9 and 10 on each side of central partition 11. The structure as a whole is preferably positioned on a concrete slab 12 which has raised feeding platforms 13 on both sides of the outer shell. These feeding platforms are inclined away from the barn so that drainage will take place toward the ground in the directions indicated by the arrows. If desired, the barn structure may be placed on the ground without regard to a supporting slab and the platforms on both sides may be of any suitable material or, in some cases, omitted altogether.

Figure 4:
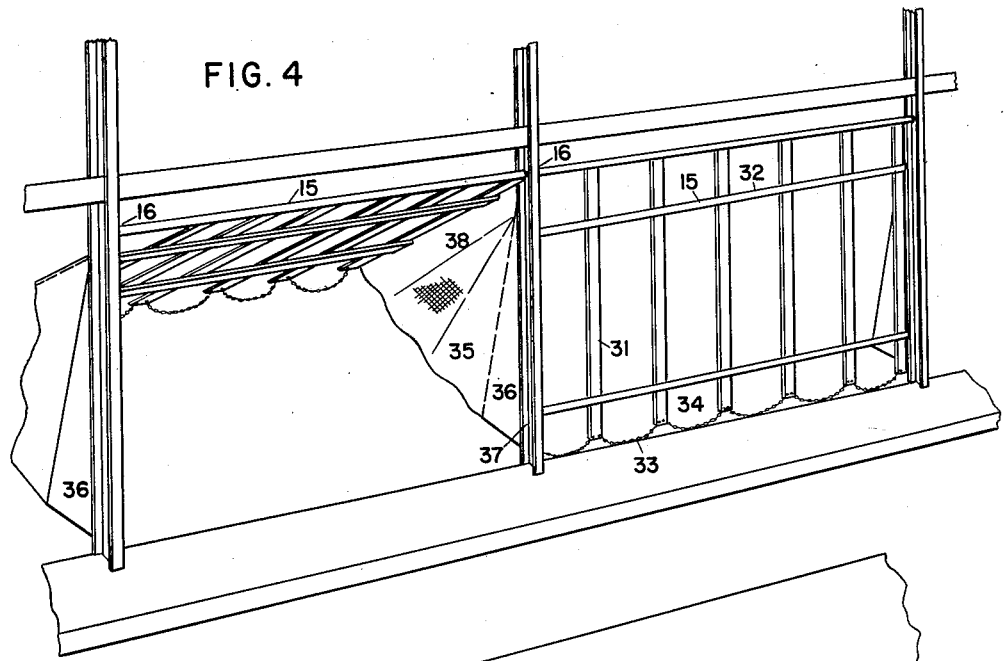
Fig. 4 illustrates in an enlarged scale one form of a feeding gate assembly together with a safety curtain between adjacent gates.

At the lower extremities of the opposite walls of outer shell 7 and feeder tunnel 8 are provided a plurality of openings 14. Within these openings 14 are positioned a series of feeding gates 15 of the type shown in greater detail in Fig. 4 or of the preferred type shown in Fig. 5. The gates shown in Fig. 4 are arranged to swing from hinges or pivots generally designated by the numeral 16. As a result, the gates will swing upwardly from the overhead pivots or hinges, as illustrated by the lefthand gate in Fig. 4.

At every opening 14 adjacent feeding gates 15 or 15a are provided one or more bulkheads 17 adapted to swing outwardly above the feeding platforms or feeding stations on the outside of the outer shell; while similar bulkheads positioned adjacent the feeding gates in the walls of the feeder tunnel are adapted to swing inwardly within the feeder tunnel as shown by the numerals 17 in Fig. 1.

It will be apparent that the bulkheads when in raised position are suitably supported in such position by any conventional mechanism 18 as illustrated in Fig. 1; and when in such raised position, more especially on the outside of the structure, afford protecting roof or covering surfaces for cattle on the feeding platforms.

When the bulkheads are in closed position, a substantially confined space exists between shell 7 and feeder tunnel 8 on each side of partition 11. Filler openings 19 for loading hay into the structure are normally closed except during the harvest season or such other times as hay may be loaded therethrough. Covers of any desired type are provided for closing the openings 19 so that the storage areas within the barn may be maintained in confined condition. Each end of the barn is enclosed by a structure of the kind illustrated in Fig. 2. End wall 20 is sized to close up each extremity of the shell structure and preferably contains sliding doors 21 for admitting cattle to the feeder tunnel; and also provides an adjustable louvre 22 for ventilation purposes.

The walls of feeder tunnel 8 are also preferably equipped with adjustable louvres 23 to permit circulation between the inside of the tunnel and storage areas.

The shell 7, tunnel 8, and end wall 20 are preferably made of metal, but may be made of any other suitable material. The bulkheads 17 may also be made of metal or of wood, as desired. The feeding gates 15 and 15a are preferably made of wood or other lightweight materials which will nevertheless be sufficiently sturdy to withstand hard usage by feeding animals.

A cat-walk 24 runs lengthwise of each storage area on both sides of partition 11 which serves to assure equal storage on both sides of the barn. The cat-walk may be reached by ladder or other suitable means and for this purpose a trap door (not shown) will be provided suitably positioned at the ceiling level of the feeder tunnel.

Figure 3:
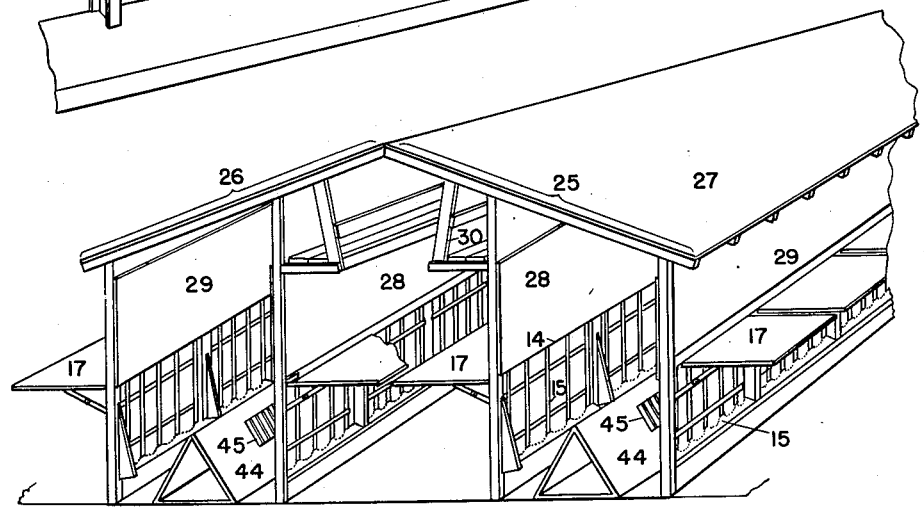
Fig. 3 is another form of barn structure for carrying out the objects of applicants' invention.

The barn structure illustrated in Fig. 3 departs from the concentric shell arrangement of Fig. 1 but nevertheless provides the advantages of applicants' invention. First, it will be noted that the barn unit designated by bracket 25 is substantially identical with the barn unit designated by bracket 26. One such unit may be employed alone and independently of any other structure for storing hay and self-feeding animals. However, if desired, such barn units may be combined as shown, to provide a more elaborate structure for feeding animals not only from outdoor positions but from feeding stations within a sheltered area.

In the structure of Fig. 3, each barn unit has a roof 27 sloping for drainage purposes and providing desired overhang portions. Opposite walls 28 and 29 are of solid construction and located above the animal feeding level. A space is provided between said walls and roof. Openings 14 are provided below the walls 28, 29 and said openings contain feeding gates 15 or 15a as in the structure of Fig. 1. Similarly, bulkheads 17 are provided adapted to swing outwardly to provide a roof or covering surfaces for animals feeding through the gates. Cat-walks 30 are provided as shown along one lengthwise side of the structure and may be reached by a ladder or other means suitably provided. While units 25 and 26 are shown without their ends enclosed, it will be understood that in practice they are enclosed from top to bottom although a small space may be provided for adjacent roof 27.

The feeding gates 15 are constructed of bars 31 and reinforcing members 32 to provide a unit in the form of a gate. Bars are vertically arranged and spaced apart so that the muzzle of an animal can reach through a space between adjacent bars but yet not permit the head to pass through the space. At the bottom of the gate is provided a series of straps or light chains 33 connecting together the extremities of adjacent bars. Thus, spaces 34 are provided through which an animal may stick his muzzle or snout but the space will not permit the head of the animal to project therethrough. As a result, if hay or other feed material is dropped behind the gate, the feeding animals on the feeding platforms beneath the bulkheads will push their muzzles through the spaces of the gates to reach the hay or other feed. As the hay is consumed, the pressure of the heads of the animals will cause the gates to swing inwardly and upwardly against the feed thus enabling the animals to reach more of it. When the feed is consumed to the point where the gate is pushed inwardly and upwardly to a position as shown on the lefthand side of Fig. 4, where the muzzles can no longer reach any feed then the animals will back away from the gate thus permitting it to drop downwardly to its original position; and hay or other feed in the storage space will thereupon drop down into the empty space made available by the receding gate.

In order to prevent animals from placing their necks or bodies into spaces between gates so that a receding gate will not injure them, a curtain 35 is provided between adjacent gates. This consists of a frame member 36 attached to stanchion 37 together with a series of folding segments 38, pleated in accordion form so that it may be extended or contracted as the gate opens upwardly and recedes downwardly.

Feeding gates 15a are preferred in most cases. Each consists of an overhead stanchion 46 supporting individual swingable bars 47. The bars 47 are interconnected by straps or light chains 33 to form spaces 34 which permit an animal to stick his muzzle between adjacent bars; but these spaces are not large enough to permit the animal to project its head therethrough. Arresting elements 48 limit the height to which the bars may be raised.

With this gate arrangement, the gate is, in effect, flexible in that portions thereof may be pushed in by individual animals reaching for feed material behind different bars and makes it easier for different animals to reach different feeding areas at the same time. Solid partitions 49 between adjacent gate sections make it virtually impossible for animals to be injured when the bars drop downwardly since the heads can only be in position directly behind the bars of an individual gate section.

Figure 5:
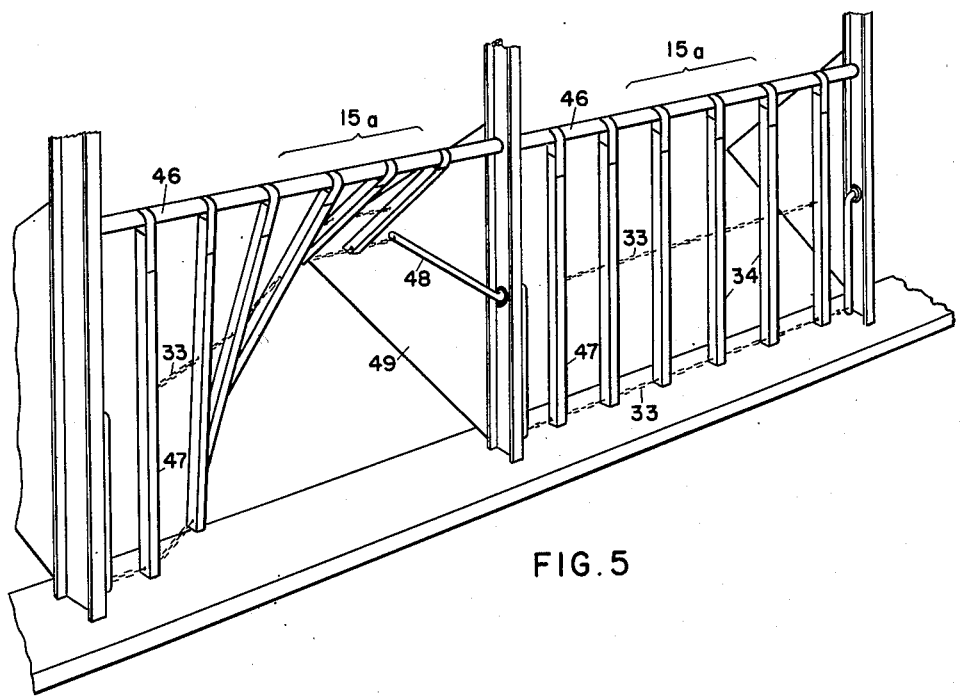
Fig. 5 illustrates in an enlarged scale another form of feeding gate with solid safety partitions between adjacent gate units.

In practice, hay or other feed material is stored by filling through filler openings 19 in the structure of Fig. 1 and through the openings above walls 28 in the structure of Fig. 3. The hay will fill the complete storage area between the outer shell and the feeder tunnel on both sides of partition 11 in the structure of Fig. 1; and will fill the complete storage space between opposite lengthwise sides of the structure of Fig. 3. While hay may be dried before it is stored in applicants' barns, it is also practical to store undried hay if drying and conditioning means are employed. Thus, as shown in Fig. 5 applicants may provide a blower system for supplying heated air to the storage areas for circulation through and drying and conditioning of stored hay. In practice, it is often feasible to dry with ordinary untreated air, when atmospheric conditions are favorable. If added heat is desired, drying may be accomplished by providing a blower 39 for supplying air through heating elements 40 whose temperature may be controlled by circulating fluids of desired temperature through the elements under control of valve 41. Steam or hot water may be circulated from any desired source through heating elements 40 for raising the temperature of the air supplied to the storage areas to a desired degree. It will be understood that electrical heating means may instead be provided for heating the air supplied by the blower; or when a gasoline engine is employed as a driving element for the blower, air may be heated by drawing it over the engine.

When it is desired to dry freshly stored hay, the air will be supplied to a supply duct 42 as in Fig. 2 running lengthwise of the feeder tunnel at the upper level thereof or the duct may at times be dispensed with as in Fig. 1 and air merely supplied into the barn through one or more air inlet openings. Suitable duct connections from supply duct 42 may, as required, be employed for routing heated air through louvres 23 for circulation through the stored hay. The air will escape through end louvres 22 and through filler openings 19 as well as through other openings in the structure since it is virtually impossible to provide an absolute sealed storage area. Where a supply duct, such as 42 is not provided in a barn such as shown in Fig. 1, an opening above doors 21 may connect with a duct from the blower so that heated air will be supplied into the tunnel itself, the tunnel then acting as a plenum space. In all cases when drying is accomplished the outer bulkheads in the structure of Fig. 1 will be closed. The inner bulkheads may be opened as desired and the louvres 23 may also be opened to a varying degree. Air may be supplied from one end or both ends of the feeder tunnel and the inside bulkheads 17 may be alternately opened and closed at different points to provide different and effective routing of untreated or heated air through desired areas of the storage spaces.

When necessary, supply openings 43 leading directly into the storage areas may also be provided for routing air to lower levels of the storage areas for effective circulation through hay at the lower levels.

In the structure of Fig. 3, when drying of stored hay is desired, all bulkheads will preferably be tightly closed and air supplied to ducts 44 positioned at the floor level of the structure. These ducts are preferably triangular in shape so that they will permit the gates to open upwardly. Ducts 44 are provided with louvres 45 which may be suitably adjusted or fixed in positions as desired. Thus, a confined area will be had and the heated air fed through ducts 44 will be discharged through louvres 45 and flow upwardly through the stored hay escaping through the openings above walls 28, 29. The triangular form of ducts 44 serves to allocate feed material to both sides of the feeding area.

While the circulation of air results in speedy and effective drying, without adversely affecting the quality of the hay, applicants do not limit themselves to any particular form of drying, and to suit individual needs may provide non-treated air heated as beforementioned, or air treated by any suitable means including electronic or diathermal means for accomplishing the same purpose.

It will be seen that applicants provide an efficient structure, which may be built economically for storing, drying and self-feeding of hay and similar feed material. The gravity feeding requires almost no labor for hay feeding and provides substantially continuous supplies of feed for animals. The availability of feed at all times at all stations assures an adequate supply to all animals and avoids the disadvantages of existing feeding methods where the stronger animals often prevent the weaker ones from getting their fill.

The use of self-feeding gates allows the animals to be fed without human interference, which is beneficial, and permits the animals to feed substantially at any time from either inside or outside the barn.

The feeding gate and bulkhead arrangements enable inexpensive hay storage structures to be placed in individual units where desired and where mild climates are encountered throughout the year, animals may feed from out of doors on both sides of the storage areas and yet have a protective covering against rain and sun. In more rigorous climates, such units may be combined to provide an inside enclosure for protection against the elements.

Of great importance, is the fact that by the use of applicants' self-feeding means, maximum yields of hay fields may be safely stored and may be made available with little labor cost when pasturage yields become seasonally inadequate. As a result, a given acreage is enabled to support a higher animal population, since maximum pasturage is afforded plus maximum storage for those occasions when pasturage alone is insufficient.

The provision for effective and speedy drying reduces the risk from loss occasioned by field drying and hence results in saving a much higher percentage of the hay crop than with former methods.

Since many variations may be employed in carrying out applicants' invention, it is intended that the following claims should not be restricted to the precise limitations of the invention.

We claim:

1. A system of storing and self-feeding of hay and similar feed material to animals which comprises retaining walls to form a substantially vertically extending wall of hay, a barrier interposed between the wall of hay and the feeding animal, said barrier including a plurality of freely swingable, vertically extending bars flexibly connected to each other adjacent one end, an overhead support for the barrier, the opposite end of each bar depending from and being pivoted on said support, said bars being spaced horizontally a distance less than the width of a head of an animal and greater than the width of the muzzle of said animal, upward movement of an end of the barrier in an arc caused by pressure exerted by the head of the feeding animal permitting the animal to consume progressively the hay on the opposite side of the barrier, movement of the barrier downward to its original position substantially restoring the wall of hay adjacent the barrier by gravity supply.

2. A system of storing and self-feeding of hay and similar feed material according to claim 1 in which arresting elements limit the height to which the bars may be raised.

3. A system of storing and self-feeding of hay and similar feed material according to claim 1 in which the bars are flexibly connected to each other adjacent their middle portions.

4. A system of storing and self-feeding of hay and similar feed material to animals which comprises retaining walls to form a substantially vertically extending wall of hay, a plurality of barriers interposed between the wall of hay and the feeding animals, each barrier being freely swingable and comprising a plurality of vertically extending bars flexibly connected to each other adjacent one end, an overhead support for the barriers, the opposite end of each bar depending from and being pivoted on said support, said bars being spaced horizontally a distance less than the width of a head of an animal and greater than the width of a muzzle of said animal, upward movement of an end of the barrier in an arc caused by pressure exerted by the head of the feeding animal permitting the animal to consume progressively the hay on the opposite side of the barrier, movement of the barrier downward to its original position substantially restoring the wall of hay adjacent the barrier by gravity supply, and safety members provided between adjacent barriers to prevent animals from placing their heads or bodies in spaces therebetween.

PAUL M. MAZUR.
ROBERT BARNHART.

REFERENCES CITED

The following references are of record in the file of this patent:

UNITED STATES PATENTS

| Number | Name | Date |
|---|---|---|
| 269,629 | Bothwell et al. | Dec. 26, 1882 |
| 275,239 | Marsh | Apr. 3, 1883 |
| 284,091 | Tolbert | Aug. 28, 1883 |
| 332,530 | Houk | Dec. 15, 1885 |
| 440,369 | Saucerman | Nov. 11, 1890 |
| 596,804 | Busch | Jan. 4, 1898 |
| 655,504 | Morris | Aug. 7, 1900 |
| 1,383,787 | Calhoon | July 5, 1921 |
| 2,000,102 | Shodron | May 7, 1935 |
| 2,000,103 | Shodron | May 7, 1935 |

FOREIGN PATENTS

| Number | Country | Date |
|---|---|---|
| 4,861 | Great Britain | Apr. 1, 1887 |
| 78,506 | Switzerland | Aug. 16, 1918 |
| 206,730 | Great Britain | Nov. 15, 1923 |
| 315,654 | Great Britain | July 18, 1929 |
| 678,568 | Germany | July 18, 1939 |